US009183384B1

(12) United States Patent
Bruhmuller (10) Patent No.: US 9,183,384 B1
(45) Date of Patent: Nov. 10, 2015

(54) LEVERAGING INDEXED DOCUMENT MATCHING TO AUTOMATICALLY TRAIN SVM CLASSIFIERS (75) Inventor: Lawrence Bruhmuller, Oakland, CA (US)

(73) Assignee: Symantec Corporation, Mountain View, CA (US)

( * ) Notice: Subject to any disclaimer, the term of this patent is extended or adjusted under 35 U.S.C. 154(b) by 853 days.

(21) Appl. No.: 12/611,049

(22) Filed: Nov. 2, 2009

(51) Int. Cl.
*G06F 21/55* (2013.01)
*G06F 21/60* (2013.01)
*G06N 99/00* (2010.01)
*H04L 29/06* (2006.01)

(52) U.S. Cl.
CPC ............ *G06F 21/552* (2013.01); *G06N 99/005* (2013.01); *G06F 21/60* (2013.01); *H04L 63/0227* (2013.01); *H04L 63/1408* (2013.01); *H04L 63/20* (2013.01)

(58) Field of Classification Search
CPC .............................. H04L 63/20; H04L 63/0227
USPC ............................................ 726/26, 1, 22, 27
See application file for complete search history.

(56) References Cited

U.S. PATENT DOCUMENTS

| | | | | |
|---|---|---|---|---|
| 7,930,353 | B2* | 4/2011 | Chickering et al. | 709/206 |
| 8,055,767 | B1* | 11/2011 | Forristal | 709/224 |
| 8,499,152 | B1* | 7/2013 | Chen et al. | 713/165 |
| 2003/0154265 | A1* | 8/2003 | Raffaele et al. | 709/221 |
| 2004/0128552 | A1* | 7/2004 | Toomey | 713/201 |
| 2004/0225645 | A1* | 11/2004 | Rowney et al. | 707/3 |
| 2005/0060532 | A1* | 3/2005 | Dorenbosch et al. | 713/100 |
| 2006/0195850 | A1* | 8/2006 | Knight et al. | 719/318 |
| 2006/0272024 | A1* | 11/2006 | Huang et al. | 726/26 |
| 2007/0094394 | A1* | 4/2007 | Singh et al. | 709/226 |
| 2007/0280112 | A1* | 12/2007 | Zheng et al. | 370/235 |
| 2008/0229419 | A1* | 9/2008 | Holostov et al. | 726/24 |
| 2008/0256354 | A1* | 10/2008 | Blumenau | 713/153 |
| 2008/0275833 | A1 | 11/2008 | Zhou et al. | |
| 2008/0289037 | A1* | 11/2008 | Marman et al. | 726/22 |
| 2009/0070881 | A1* | 3/2009 | Yellepeddy et al. | 726/26 |
| 2009/0119579 | A1* | 5/2009 | Fellenstein et al. | 715/234 |
| 2009/0221266 | A1* | 9/2009 | Ohta et al. | 455/411 |
| 2009/0228565 | A1* | 9/2009 | Kalyan et al. | 709/206 |
| 2009/0325562 | A1* | 12/2009 | Hough et al. | 455/418 |
| 2010/0011000 | A1* | 1/2010 | Chakra et al. | 707/9 |

(Continued)

OTHER PUBLICATIONS

Laura Auria, Rouslan A. Moro, "Support Vector Machines (SVM) as a Technique for Solvency Analysis", DIW Berlin, German Institute for Economic Research, Berlin, Aug. 2008.*

(Continued)

*Primary Examiner* — Alexander Lagor
(74) *Attorney, Agent, or Firm* — Lowenstein Sandler LLP (57) ABSTRACT

A method and apparatus for automatically training a data loss prevention (DLP) agent deployed on an endpoint device is described. In one embodiment, the method includes monitoring information content on a client computer system for violations of a policy. The method further includes determining, with the client computer system, whether a violation of the policy has occurred for the information content based on a classifier. The method may also include transmitting monitored data indicative of a policy decision and the information content to a remote system and receiving a response from the remote system including an updated classifier, wherein the updated classifier was automatically generated by the remote system utilizing fingerprint matching.

16 Claims, 6 Drawing Sheets

(56) References Cited

U.S. PATENT DOCUMENTS

2011/0083159 A1* 4/2011 Brown et al. .................. 726/1
2011/0083190 A1* 4/2011 Brown et al. .................. 726/26

OTHER PUBLICATIONS

Burges, Christopher JC. "A tutorial on support vector machines for pattern recognition." Data mining and knowledge discovery 2.2 (1998): 121-167.*

"Support Vector Machines (SVMO in Ruby," downloaded Mar. 23, 2010, from the igvita.com website: http://www.igvita.com/2008/01107/support-vector-machines-svm-in-ruby, 1-12 pages.

"18 Support Vector Machines," downloaded on Mar. 23, 2010, from Oracle website: http://download.oracle.com/docs/cd/B28359_01/datamine.111/b28129/algo_svm.htm#DMCON025 1-6 pages.

"Websense Content Research Cortex," A Websense Technical White Paper, 24 pages.

Kato, Mamoru, et al., "Three Non-Bayesian Methods of Spam Filtration: CRM114 at TREC 2007," 7 pages.

* cited by examiner

LEVERAGING INDEXED DOCUMENT MATCHING TO AUTOMATICALLY TRAIN SVM CLASSIFIERS

FIELD OF INVENTION

Embodiments of the invention relate to the field of processing data, and more particularly, to automatically training a data loss prevention (DLP) agent deployed on an endpoint device.

BACKGROUND OF THE INVENTION

Data Loss Prevention (DLP) involves computer and information security, where DLP systems identify, monitor, and protect data in use (e.g., endpoint actions), data in motion (e.g., network actions), and data at rest (e.g., data storage). DLP systems may be deployed at user endpoint devices, network servers, etc. to inspect information content. DLP systems are designed to detect and prevent the unauthorized use and transmission of confidential information.

Client computer systems and devices, such as personal computers, laptop computers, personal digital assistants, smart phones, etc. are prolific in modern organizations. Often these systems include applications that allow users to create and edit documents, spreadsheets, presentations, databases, etc, which are referred to collectively as "documents." These systems also increasingly include the capability to transfer the documents, as well as other sensitive data, to other systems.

DLP systems that are employed at endpoint devices, to prevent the unwanted or unintended transmission of sensitive information, are usually lightweight applications due to the limited resources of the endpoint device (e.g., limitations resulting from a CPU, memory, disk size, processing speed, etc.). To achieve high accuracy in detecting sensitive documents in this resource-limited environment, training of the application typically required. However, if this training is only performed in advance of deployment on an endpoint system, false positive and false negative DLP decisions for new information content may result. To rectify an overabundance of false DLP decisions, some endpoint DLP applications may be retrained. However, retraining an endpoint DLP system involves human interaction which is costly, time-consuming, and highly inefficient.

SUMMARY OF THE INVENTION

A method and apparatus for automatically training a data loss prevention (DLP) agent deployed on an endpoint device is described. According to an exemplary method, a computer system monitors information content for violations of a policy, determines whether a violation of the policy has occurred for the information content based on a classifier, transmits monitored data indicative of a policy decision and the information content to a remote system, and receives a response from the remote system including an updated classifier. In one embodiment, the updated classifier was automatically generated by the remote system utilizing fingerprint matching. In some embodiments, the computer system may be one of a personal digital assistant, cellular telephone, netbook, laptop computer, or personal computer.

In some embodiments, the exemplary method includes automatically replacing the classifier with the updated classifier, and determining whether policy violations occur for monitored information content based on the updated classifier. In some embodiments, the updated classifier was generated by the remote system utilizing fingerprint matching based on the data indicative of the policy decision and the information content. In some embodiments, the classifier and the updated classifier are support vector machine classifiers.

In some embodiments, the exemplary method includes making a plurality of policy decisions for a plurality of corresponding information content items, transmitting data indicative of the plurality of policy decisions and the plurality of corresponding information content items to the remote system, and receiving a response from the remote system including the updated classifier. In some embodiments the updated classifier was generated by the remote system utilizing the fingerprint matching based on the data indicative of the plurality of policy determinations and the plurality of corresponding information content items.

Another method and apparatus for automatically training a data loss prevention (DLP) agent deployed on an endpoint device is described. According to a second exemplary method, a computer system receives a first policy decision and information content that formed a basis of the first policy decision from a client computer system, makes a second policy decision, with a server computer system, based on the information content and a fingerprint-based DLP policy decision, automatically retrains the classifier to be consistent with the second policy decision when the first policy decision and second policy decision are inconsistent, and transmits the retrained first classifier to the client computer system.

In some embodiments, the second exemplary method includes receiving a training set of information content, automatically training the classifier based on fingerprint-based policy decisions made from the training set of information content, and transmitting the classifier to the client computer system. In some embodiments, the second exemplary method includes retraining the classifier to be consistent with a plurality of fingerprint-based policy decisions. In some embodiments, the classifier is a support vector machine classifier.

In addition, a computer readable storage medium for automatically training a data loss prevention (DLP) agent deployed on an endpoint device is described. An exemplary computer readable storage medium provides instructions, which when executed on a processing system causes the processing system to perform a method such as the exemplary methods discussed above.

Further, a system for automatically training a data loss prevention (DLP) agent deployed on an endpoint device is described. An exemplary system may include a memory and a server computer system coupled with the memory. In some embodiments of the exemplary system, the server computer system is to receive a first policy decision and information content that formed a basis of the first policy decision from a client computer system, the first policy violation decision based on a classifier for data loss prevention (DLP), make a second policy decision based on the information content and a fingerprint-based DLP policy decision, automatically retrain the classifier to be consistent with the second policy decision when the first policy decision and second policy decision are inconsistent, and transmit the retrained first classifier to the client computer system.

In some embodiments, the exemplary system further includes the client computer system communicably coupled with the data monitoring server over a network. In some embodiments, the client computer system is to monitor information content on the client computer system for violations of a policy, determine whether a violation of the policy has occurred for the information content based on a classifier, transmit monitored data indicative of a policy decision and the information content to the server computer system, and receive a response from the server computer system including an updated classifier. In some embodiments, the updated classifier was automatically generated by the server computer system utilizing fingerprint matching.

In some embodiments, the exemplary systems further includes the client computer system to automatically replace the classifier with the updated classifier and determine whether policy violations occur for monitored information content based on the updated classifier. In some embodiments, the updated classifier was generated by the server computer system utilizing fingerprint matching based on the data indicative of the policy decision and the information content. In some embodiments, the classifier and the updated classifier are support vector machine classifiers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for automatically training a data loss prevention (DLP) agent deployed on an endpoint device is described. In one embodiment, information content is monitored on a client computer system for violations of a policy. In one embodiment, the information content may include information content within application files, email messages, text messages, instant messages, etc. In one embodiment, a determination is made whether a violation of the policy has occurred for the information content based on a classifier. In one embodiment, a policy may include a set of rules pertaining to data loss prevention (DLP) that specify which actions should be taken when a message contains confidential information (e.g., source data being protected). If a message contains confidential information, the policy may require that the message be blocked, reported, re-routed, etc.

In one embodiment, the monitored data indicative of a policy decision and the information content are transferred to a remote system. A response may then be received from the remote system including an updated classifier. In one embodiment, the updated classifier is automatically generated by the remote system utilizing fingerprint matching. In one embodiment, policy decisions, source data for those decisions, and updated classifiers continue to be communicated without the intervention of a user. As a result, the updated classifiers are automatically retrained and refined over time policy decisions continue to be made.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
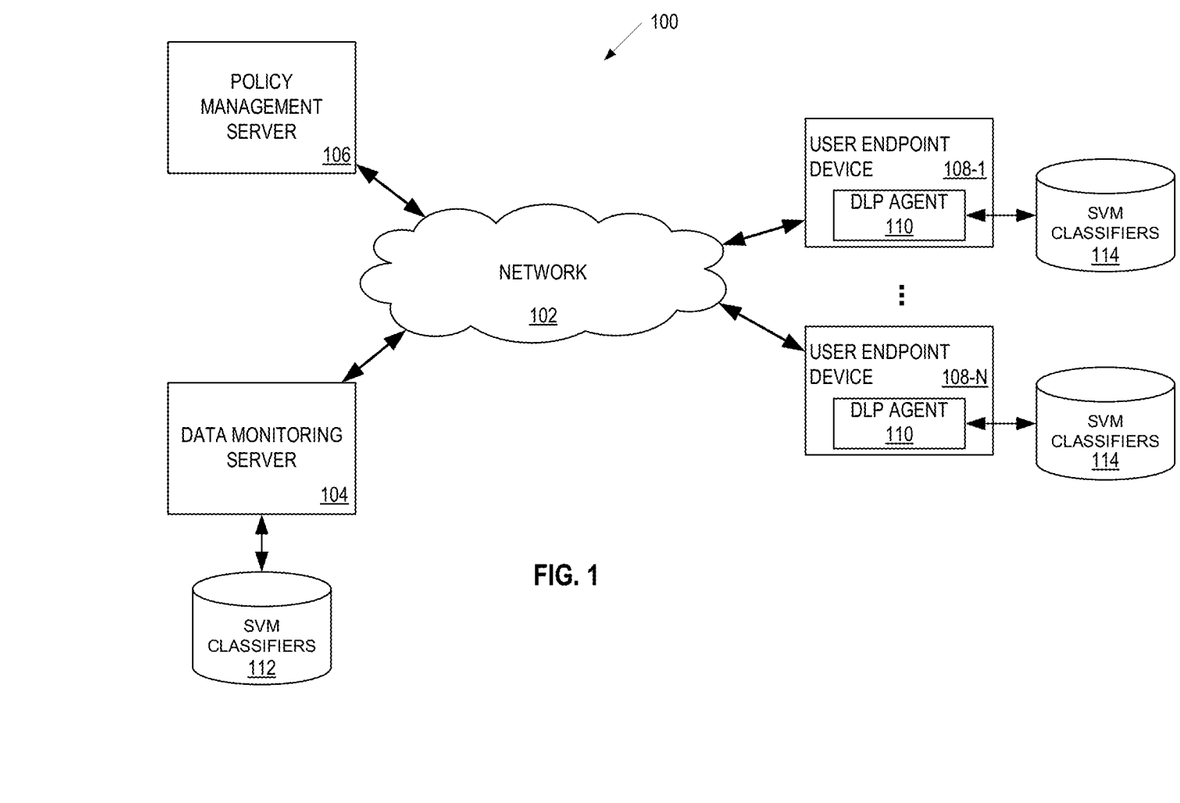
FIG. 1 is a block diagram of exemplary system architecture for automatically training a data loss prevention (DLP) agent deployed on an endpoint device.

FIG. 1 is a block diagram of exemplary system architecture 100 for automatically training a data loss prevention (DLP) agent deployed on an endpoint device. In one embodiment, the system 100 includes a data monitoring server (DMS) 104, a policy management server (PMS) 106, and a plurality of user endpoint devices (e.g., user endpoint device 108A to 108N). The DMS 104 and the PMS 106 may reside on the same or different machines (e.g., a server computer system, a gateway, a personal computer, etc.). The DMS 104, PMS 106 and user endpoint devices 108 may be coupled to a computer network that communicates any of the standard protocols for the exchange of information. They may run on one Local Area Network (LAN) and may be incorporated into the same physical or logical system, or different physical or logical systems.

Alternatively, the DMS 104, PMS 106, and user endpoint devices (e.g., user endpoint device 108-1 to 108-N) may reside on different LANs that may be coupled together via the Internet but separated by firewalls, routers, and/or other network devices. In yet another configuration, the PMS 104 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The PMS 106 is responsible for receiving parameters pertaining to data loss prevention (DLP) policies, such as pre-configured template policies or customized policies, and creating policies based on these parameters. In one embodiment, the PMS 106 receives the policy parameters via a policy definition graphical user interface (not shown). In another embodiment, the PMS 106 receives the policy parameters from an Application Programming Interface (API) or via a configuration file formatted in text or a defined data format (e.g., extensible markup language (XML) or binary format). In one embodiment, a policy specifies source data that should be protected from unauthorized transmission, access or any other use. The source data may include structured data stored in databases or other tabular formats. Such structured source data may consist of, for example, customer, employee, patient or pricing information. Alternatively, the source data may include unstructured data stored in documents from file systems or other document repositories. Such unstructured source data may include design plans, source code, CAD drawings, financial reports, and any other sensitive or proprietary information stored in documents.

A policy may include a set of rules that specify which actions should be taken when a message contains confidential information (e.g., the source data being protected). For example, a message may represent a transmitted document (e.g., an email message, a web mail message, etc.), a document generated by an application, or data stored in databases, caches, etc. If a message contains confidential information, the policy may require that the message be blocked, reported, re-routed, etc.

In one embodiment, the DMS 104 detects messages (e.g., sent email messages, instant messages, text messages, and/or other documents according to a configuration of the DMS 104) containing confidential information using fingerprints of the confidential information such as fingerprints of confidential documents from file systems or other document repositories (e.g., design plans, source code, CAD drawings, financial reports, and any other sensitive or proprietary information stored in documents), or fingerprints of confidential information stored in a database (e.g., customer, employee, patient or pricing information). The use of fingerprints allows the DMS 104 to accurately detect confidential information in messages transmitted over network 102. However, such fingerprints cannot be effectively used for detection of confidential information locally on the user endpoint devices 108 (e.g., laptops or PDAs) where resources (e.g., CPU, memory, disk size and speed, etc.) are limited. In order to address the above limitations of endpoint devices 108, embodiments of the present invention detect confidential information on user endpoint devices 108 using support vector machine (SVM) classifiers, which requires significantly less resources than the fingerprint-based detection approach. In order to improve the accuracy of SVM classifiers, embodiment of the present invention automatically train the SVM classifiers as will be discussed in more detail below.

In one embodiment, DMS 104 creates and trains a support vector machine (SVM) classifier. SVM classification is based on the concept of creating a decision plane that separates a set of objects into two categories of membership. For example, informational content in a document either does or does not contain confidential information. When information content is categorized as such, DLP policies can be applied against the informational content based on results of an SVM classification decision to determine what action needs to be taken with respect to the information content. In one embodiment, SVM classification utilizes features, such as words, sentences, etc. obtained from informational content. This set of features defines a vector representing the information content. A predictor function is then applied to the vector to determine how the document should be classified.

In one embodiment, a DLP policy specifies what information needs to be present in a message to trigger a violation, and this information is used to create a set of features for SVM classification. Alternatively, the set of features is created prior to the creation of a DLP policy (e.g., based on user input), and a DLP policy refers to a specific SVM classifier that should be used for detecting policy violations.

In one embodiment, DMS 104 trains an SVM classifier by first creating a predictor function from a set of training documents. In one embodiment, each of the training documents is known to belong to one of two sets (i.e., does or does not contain confidential information). Each of the documents is then searched for features, such as particular words, phrases, sentences, etc. The document features may be a fixed set of document attributes, an evolving set of document attributes, a fixed or evolving set of words, words or other information content specified by a user, or other data that implies a potential DLP issue. Furthermore, the document features may include words that necessitate a DLP decision such as the words confidential, social security number, private, etc. The document features may also include words that do not implicate a DLP decision, such as public, words of common usage, famous names, company names, etc. Because the documents are known to belong to one of two classifications, the universe of decisions is then created based on the feature vectors for the training documents, where each vector falls in the universe of decisions. In one embodiment, DMS 104 creates a predictor function, such as a binary, multi-category, regression, etc. function, which maximizes the distance between the feature vectors of the information content from the two categories when the predictor function is applied to the feature vectors. As a result, a new document which was not part of the training set can thereafter be classified by the SVM classifier by searching the new document for the features, creating a corresponding feature vector, and applying the predictor function to the feature vector to obtain classification results.

In one embodiment, the SVM classification results are utilized to make DLP policy decisions. In one embodiment, DMS 104 creates a single SVM classifier for multiple DLP policies and/or multiple DLP Agents 110. In another embodiment, DMS 104 creates multiple SVM classifiers each for different DLP policies. In yet another embodiment, DMS 104 creates multiple SVM classifiers, each corresponding to a single DLP agent 110. In one embodiment, DMS 104 transmits an initial SVM classifier to DLP agents 110 to enable the agents to perform policy enforcement for information content based on the initial SVM classifier. In each of the embodiments, DMS 104 stores the SVM classifier(s) in database 112. In one embodiment, database 112 stores SVM classifiers in a cache memory, local persistent memory, hard disk, or other storage. Furthermore, in one embodiment, database 112 may be integrated within DMS 104 or be communicably coupled over a network with DMS 104.

In one embodiment, the user endpoint devices (e.g., user endpoint devices 108-1 to 108-N) assist the DMS 104 in detecting policy violations by monitoring information content locally (e.g., files and/or other documents) on the user endpoint devices 108. In one embodiment, the information content is monitored in real-time by a data loss prevention (DLP) agent 110 of the user endpoint devices 108, utilizing the SVM classifier supplied by the DMS 104. In one embodiment, user endpoint devices 108-1 to 108-N are client devices, such as, for example, personal computers, laptop computers, cellular telephones, personal digital assistants (PDAs), netbooks, etc. In one embodiment, user endpoint devices 108 store SVM classifier(s) in a database 114 within a cache memory, local persistent memory, hard disk, or other storage of user endpoint device 108.

In one embodiment, DLP agents 110 extract features from information content stored on, processed by, or transmitted from a user endpoint device 108. After features are extracted from a particular piece of information content, the corresponding feature vector is utilized as an input to the predictor function. Based on the results of the predictor function, the information content is classified as belonging to one of two groups. In one embodiment, the two groups correspond to information content that violates a DLP policy and information content that does not violate a DLP policy. As noted above, a DLP agent 110 may utilize several SVM classifiers where each classifier is associated with specific policies. As a result DLP agent 110 may further determine specific violations of specific policies.

In one embodiment, once a DLP Agent 110 has detected a policy violation utilizing an SVM classifier, the DLP Agent 110 notifies the DMS 104, which then reports the policy violation to an appropriate entity (e.g., a manager, database administrator, a reporting system, etc.) or performs some other action. In one embodiment, the DLP agent 110 further performs one or more remedial actions in response to detecting a policy violation. Such remedial actions may include one or more of blocking the transmission of information that violates a policy, displaying a warning message to a user, transmitting a message regarding the violation to an appropriate third party, etc.

In one embodiment, once a DLP Agent 110 has made a policy violation decision utilizing the SVM classifier, the DLP Agent 110 notifies the DMS 104 of the results of the policy decision regardless of whether the decision resulting in a policy violation or a non-violation. In one embodiment, DLP Agent 110 further transmits the data the DLP Agent 110 utilized in reaching the policy decision (i.e., text from a document, attachment from an email, etc.). In one embodiment, as discussed in greater detail below, DMS 104 utilizes the policy decisions made by a DLP Agent 110 and the data that formed the basis for decision to automatically retrain the SVM classifier deployed on the DLP Agent 110.

In one embodiment, the DMS 104 utilizes fingerprint-based matching to retrain the SVM classifier used by DLP Agents 110. In one embodiment, DMS 104 performs fingerprint-based matching on the informational content received from a DLP agent 110. Fingerprint-based matching may include, for example, creating a fingerprint of the information content, which is then compared to a library of fingerprints corresponding to DLP policies. Based on the comparison results, DMS 104 determines whether the informational content fingerprint matches a fingerprint from the library, which violates a policy. In one embodiment, when the DMS's 104 fingerprint-based decision is inconsistent with the decision made by the DLP agent 110, DMS 104 retrains the SVM classifier.

In one embodiment, DMS 104 retrains an SVM classifier by adding the fingerprint-based decision to the decisions of the training set of documents. DMS 104 tunes the SVM predictor function based on this expanded data set. In one embodiment, the retrained predictor function maximizes the distance between categories of information content (i.e., those known to violate a DLP policy and those known not to violate a DLP policy) based on the set of training document decisions and the fingerprint-based decisions of the DMS 104.

In one embodiment, the DLP Agents 110 and the DMS 104 continue to communicate policy decisions, source data for those decisions, and updated SVM classifiers without the intervention of a user. As a result, the SVM classifiers deployed by the DLP Agents 110 are automatically retrained and refined over time as the DLP Agents 110 continue to make policy decisions. Although initial SVM classifiers may not be as accurate as fingerprint-based evaluations, because the DMS 104 utilizes a more powerful and accurate classifier to retrain the SVM classifiers, the SVM classifiers continue to approach the accuracy of the fingerprint-based evaluations while still maintaining the efficiency and suitability desired for deployment by DLP Agents 110.

In one embodiment, DMS 104 retrains SVM classifiers utilizing each of the SVM-based policy decisions made by each DLP Agent 110. Thus, in one embodiment, all of the DLP agents 110 are utilized to retrain all SVM classifiers. In another embodiment, only SVM-based policy decisions by DLP agents 110 belonging to individual users, or specific groups of users, are utilized to retrain SVM classifiers for those particular individuals or groups. In either embodiment, the classifiers utilized by DLP agents 110 will become more accurate over time, particularly if there is overlap between the confidential data on the same DLP agent 110 or a group of DLP agents 110.

In one embodiment, the automatic retraining of classifiers for individual DLP agents, specific groups of DLP agents, or all DLP agents is combined with human-in-the-loop based retraining. In this embodiment, human-based retraining of SVM classifiers may correct situations where fingerprint-based policy decisions are less than completely accurate.

Figure 2:
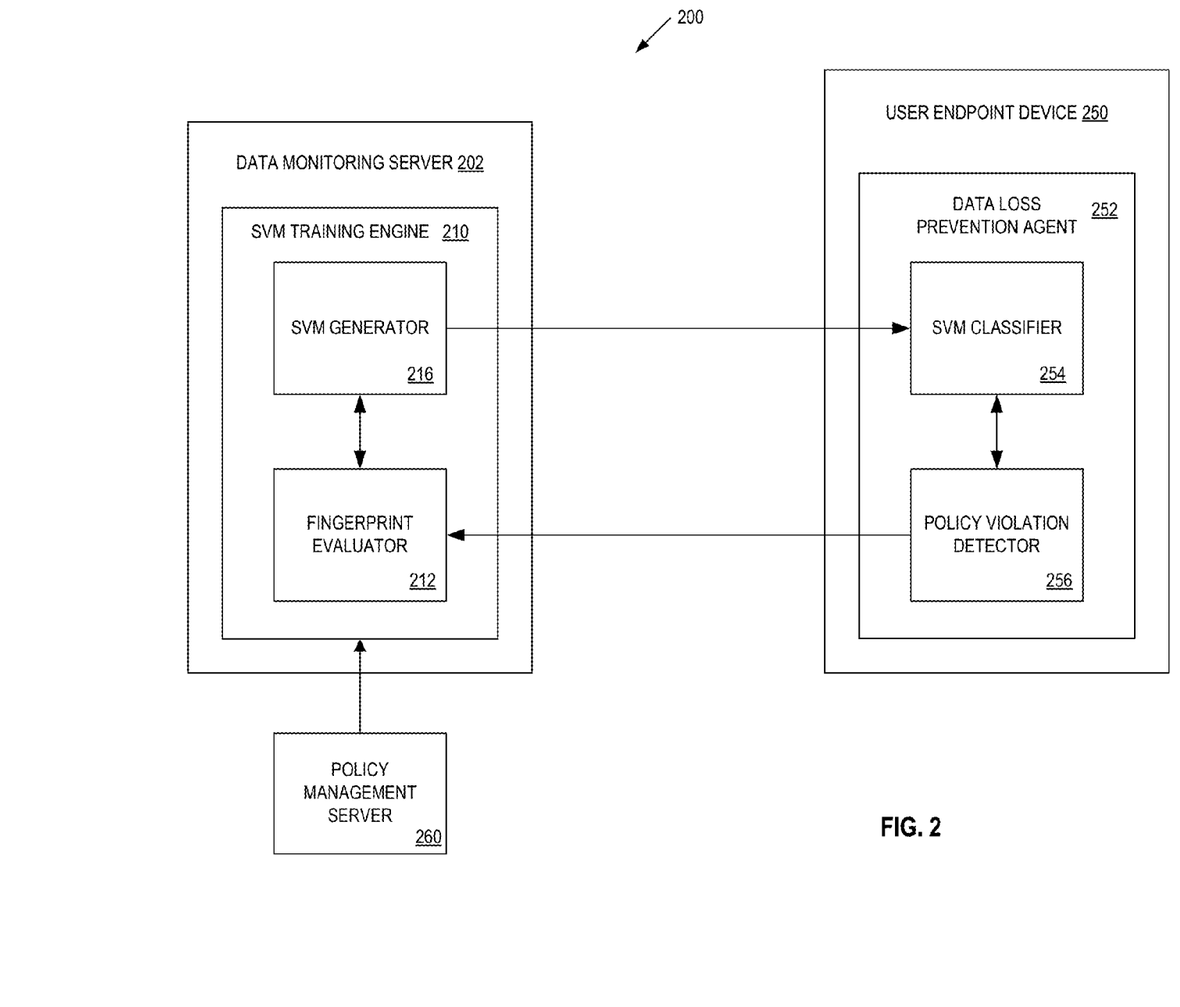
FIG. 2 is a block diagram of one embodiment of a system including a data monitoring server and a user endpoint device for automatically training a DLP agent of the user endpoint device.

FIG. 2 is a block diagram of one embodiment of a system 200 including a data monitoring server 200 and a user endpoint device 250 for automatically training a DLP agent 252 of the user endpoint device.

In one embodiment, Policy Management Server 260 is responsible for receiving policy violation training documents and associated user preferences. In one embodiment, PMS 260 transmits the training documents and/or user preferences to data monitoring server (DMS) 202.

In one embodiment, DMS 202 is responsible for creating, training, and automatically retraining SVM classifiers to be deployed on user endpoint device 250. In one embodiment, SVM training engine 210 receives a set of training documents from PMS 260 and provides the training document to the SVM Generator 216. SVM Generator 216 utilizes the training documents, as discussed above, to generate an initial SVM classifier including an initial predictor function. DMS 202 then transmits the initial SVM classifier to DLP agent 252 of the user endpoint device 250.

In one embodiment, DLP agent 252 is responsible for the real-time monitoring and policy enforcement for information content sent by the user endpoint device 250, or created, stored or received at the user endpoint device 250. In one embodiment, DLP agent 252 applies the received SVM classifier 254 for use by a policy violation detector 256. In one embodiment, policy violation detector 254 is responsible for real-time monitoring of information content utilizing SVM classifier 254. In one embodiment, SVM classifier 254 generates a feature vector for information content processed by user endpoint device 250. For example, if user endpoint device 250 attempts to send an email, SVM classifier 254 will extract features from the text and/or attachment(s) of the email, create feature vector(s), and apply the predictor function to the feature vectors. SVM classifier 254 provides the results of the predictor function, which categorize the information content as either violating or not violating a DLP policy, to policy violation detector 256.

In one embodiment, policy violation detector 256 utilizes results of SVM classifier 254 to decide what action needs to be performed with respect to the information content. For example, if the information content violates a DLP policy, policy violation detector 256 may generate a policy violation report, and send the report to DMS 202 for transmission to an appropriate source, such as a network administrator, database, etc. Policy violation detector 254 is also responsible for transmitting policy decisions and the data which was the basis for the decisions to SVM training engine 210. In one embodiment, policy violation detector 254 transmits the decisions and source data as the decisions are made. In another embodiment, policy violation detector 254 transmits the decisions and source data in batches, when user endpoint device 250 and/or DLP agent 252 are idle, in response to a request of the DMS 202, etc.

Figure 6:
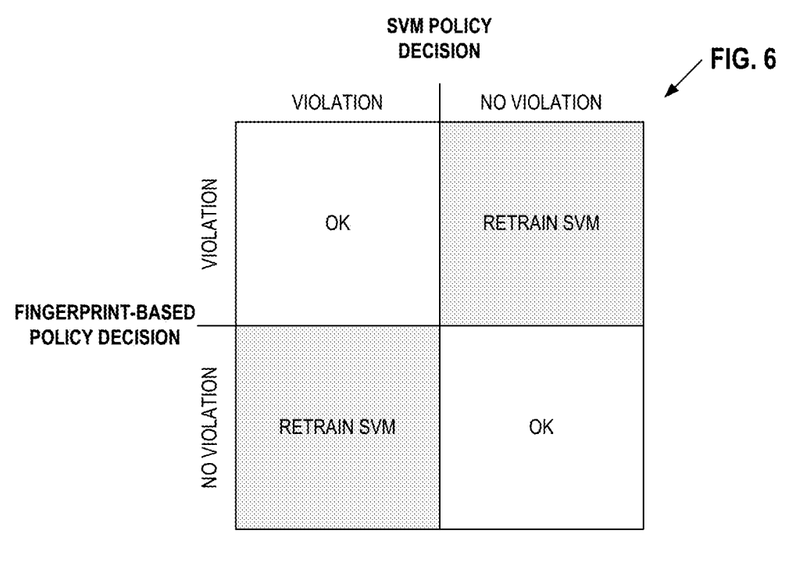
FIG. 6 illustrates an exemplary decision matrix for determining when to retrain a classifier deployed on a user endpoint device.

In one embodiment, when SVM training engine 210 receives policy decisions and source data from DLP agent 252, fingerprint evaluator 212 makes its own policy decision based on the source data. In one embodiment, when the policy decision of the fingerprint evaluator 212 and the SVM classifier 254 differ, SVM Generator 216 captures the inconsistency, as well as the source data, in order to retrain the SVM classifier. In one embodiment, SVM Generator 216 determines whether to retrain an SVM classifier based on the decision matrix illustrated in FIG. 6.

In one embodiment, SVM Generator 216 utilizes the policy decision made by the fingerprint evaluator 212 to retrain the SVM classifier 254. As discussed above, the predictor function associated with the SVM classifier is tuned to account for the new policy decision which has been added to the universe of policy decisions known to SVM generator 216. After retraining the SVM classifier, SVM generator 216 transmits the updated SVM classifier to DLP agent 252. As a result, if the policy violation detector 256 were to encounter similar source data, a decision based on the retrained SVM classifier 254 would match that made by the fingerprint evaluator 212 performed by the DMS 202. Thus, over time and as the SVM classifier is retrained, the SVM classifier is made more accurate.

Furthermore, in one embodiment, the transmission of classifiers, policy decisions, and source data, are each performed without any intervention of a user. Thus, the SVM classifier utilized by DLP agent 252 is automatically retrained and refined. Furthermore, the DLP agent 252 benefits from the use of a computationally lightweight SVM classifier that has the decision making accuracy of a more computationally involved fingerprint-based evaluation.

The components of FIG. 2 may represent module that can be combined together or separated into further modules, according to some embodiments.

Figure 3:
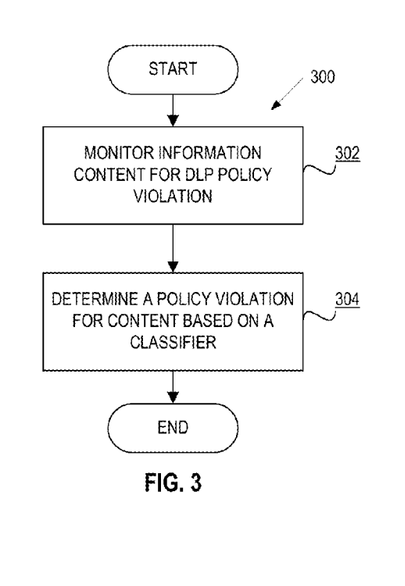
FIG. 3 is a flow diagram of one embodiment of a method for data loss prevention based on policy violations.

FIG. 3 is a flow diagram of one embodiment of a method 300 for data loss prevention based on policy violations. The method 300 is performed by processing logic that may comprise hardware (circuitry, dedicated logic, etc.), software (such as is run on a general purpose computer system or a dedicated machine), or a combination of both. In one embodiment, the method 300 is performed by a data loss prevention agent of a user endpoint device (e.g., DLP agent 252).

Referring to FIG. 3, processing logic begins by monitoring information content on a client for a data loss prevention (DLP) policy violation (processing block 302). As discussed above, the information content may include information content within application files, email messages, text messages, instant messages, etc. In one embodiment, processing logic monitors the information content in real-time.

Processing logic then determines whether a policy violation has occurred for monitored information content based on a DLP classifier (processing block 304). In one embodiment, the classifier is an SVM classifier. In one embodiment, as discussed above, processing logic extracts features from information content, applies a predictor function to a resulting feature vector, and categorizes the document as either violating or not violating a DLP policy based on results of the predictor function. In one embodiment, processing logic of a DLP agent utilizes the SVM classifier because it is a relatively lightweight DLP classifier (i.e., a lower memory footprint, less management, and higher performance). As a result, in one embodiment, the SVM classifier is well suited for deployment by processing logic of limited capability or mobile devices.

Figure 4:
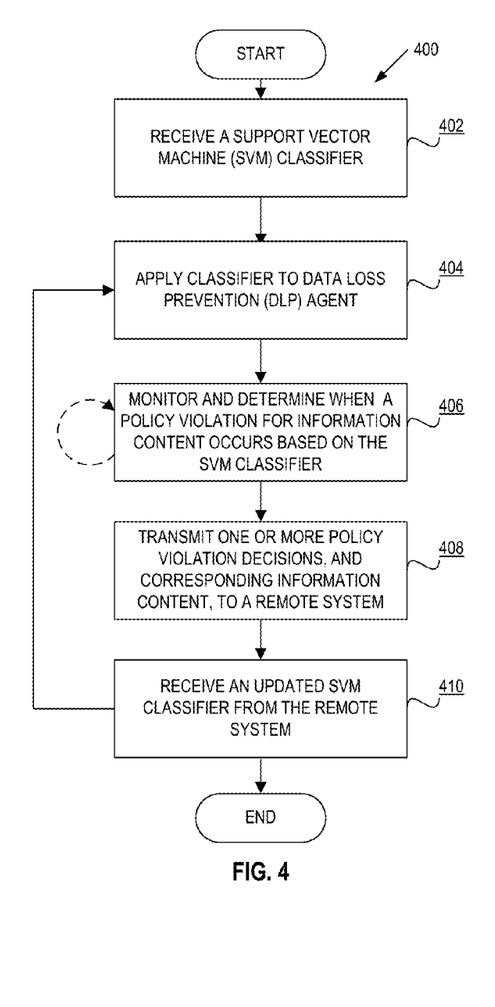
FIG. 4 is a flow diagram of one embodiment of a method for a user endpoint device applying DLP classifiers for data loss prevention.

FIG. 4 is a flow diagram of one embodiment of a method 400 for a user endpoint device applying DLP classifiers for data loss prevention. The method 400 is performed by processing logic that may comprise hardware (circuitry, dedicated logic, etc.), software (such as is run on a general purpose computer system or a dedicated machine), or a combination of both. In one embodiment, the method 400 is performed by a data loss prevention agent of a user endpoint device (e.g., DLP agent 252).

Referring to FIG. 4, processing logic begins by receiving a support vector machine (SVM) classifier (processing block 402). In one embodiment, the SVM classifier includes an SVM predictor function. Processing logic then applies the SVM classifier to a DLP agent (processing block 404). In one embodiment, processing logic receives the SVM classifier from a data monitoring server. In one embodiment, the DLP agent is deployed on a user endpoint device, such as a cellular telephone, laptop computer, PDA, netbook, etc.

Processing logic monitors and determines when a policy violation for information content occurs based on the SVM classifier (processing block 406). As discussed above, processing logic extracts features from information content, applies a predictor function to a resulting feature vector, and categorizes the document as either violating or not violating a DLP policy. In one embodiment, the SVM classifier is a DLP classifier that was generated from a set of training documents. In one embodiment, the SVM classifier enables processing logic to categorize text in information content according to the DLP policies that embody the classifier. Then based on the content of the information content and the policy rules, processing logic decides whether the information content violates or does not violate any of the data loss prevention policies of the SVM classifier. In one embodiment, processing logic utilizes the policy decisions to enforce one or more DLP processes, such as blocking a data transmission, triggering a warning to a user of an endpoint device, generating and transmitting a message regarding the violation to a network administrator, etc. Other remedial actions for policy violation detections may be made. In one embodiment, processing logic continuously monitors information content to determine, in real time, whether a policy violation has occurred.

Processing logic transmits one or more policy decisions and corresponding information content that was the basis for the policy decisions, to a DMS (processing block 408). In one embodiment, processing logic transmits the policy decisions and source information content for those decisions to a data monitoring server, such as DMS 202 of FIG. 2. In one embodiment, processing logic transmits the policy decisions and source data in batches of a predefined size. In one embodiment, processing logic further transmits the batches of policy decisions and source data at predetermined times, such as preset time intervals, a specific time of day, a time when a user endpoint device is idle, etc.

Processing logic then receive an updated SVM classifier from the remote system (processing block 410). In one embodiment, the remote system is a data loss prevention server computer system. In one embodiment, as discussed in greater detail below, the updated SVM classifier is a retrained version of the initial SVM classifier. In one embodiment, the updated SVM classifier includes an SVM predictor function that has been updated through the retraining of the SVM classifier with decision made by a more powerful document matching technique, such as fingerprint matching or other forms of document matching. Furthermore, as discussed below, the retraining utilizes the actual decisions and data used by the SVM classifier in making policy decisions. Thus, as the SVM classifier is refined over time, the data loss prevention decisions and policy enforcements made by the user endpoint device will approach that of the much more computationally intensive and precise data monitoring server classifications and policy enforcements. Despite the increased accuracy of the retrained SVM classifier, the computational benefits of utilizing an SVM classifier (e.g., lower computational expense, smaller memory footprint, less management, etc.) are retained for a limited capability user endpoint device, as well as other user endpoint devices.

Figure 5A:
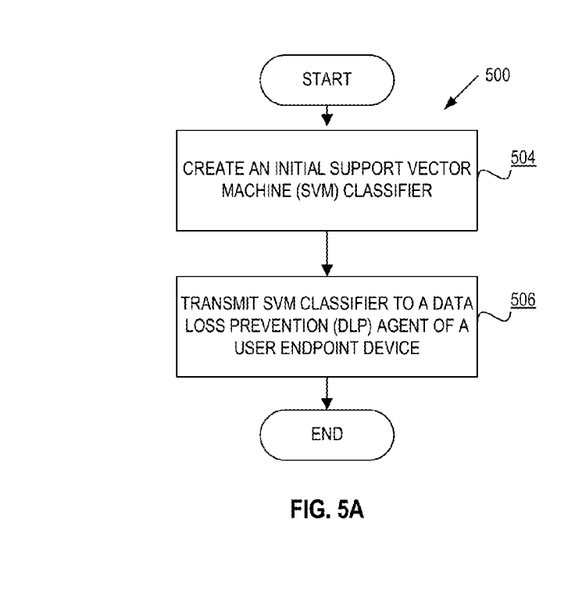
FIG. 5A is a flow diagram of one embodiment of a method for a data monitoring server generating an initial DLP classifier to be deployed by a user endpoint device.

FIG. 5A is a flow diagram of one embodiment of a method 500 for a data monitoring server generating an initial DLP classifier to be deployed by a user endpoint device. The method 500 is performed by processing logic that may comprise hardware (circuitry, dedicated logic, etc.), software (such as is run on a general purpose computer system or a dedicated machine), or a combination of both. In one embodiment, the method 500 is performed by an SVM training engine of a data monitoring server (e.g., SVM training engine 210).

Referring to FIG. 5A, processing logic begins by creating an initial SVM classifier (processing block 504). In one embodiment, the SVM classifier is created from an initial set of documents, where each document is known to either violate a DLP policy or not violate a DLP policy. Furthermore, in one embodiment, a feature set is included with the training set of document. As discussed above, the feature set may include words that could potentially trigger a DLP policy violation (e.g., confidential, secret, private, SSN, etc.), as well as include benign words. Because the documents are known to belong to one of two classifications, the universe of decisions is then created based on the feature vectors for the training document, where each vector falls in the universe of decisions. In one embodiment, processing logic creates a predictor function, such as a binary, multi-category, regression, etc. function, which maximizes the margin between the two categories when it is applied to the feature vectors.

Processing logic then transmits the SVM classifier to a DLP agent of a user endpoint device (processing block 506). As discussed above, the DLP agent applies the SVM classifier to categorize information content for DLP policy violation monitoring, policy violation detection, and to take remedial actions when violation are detected.

Figure 5B:
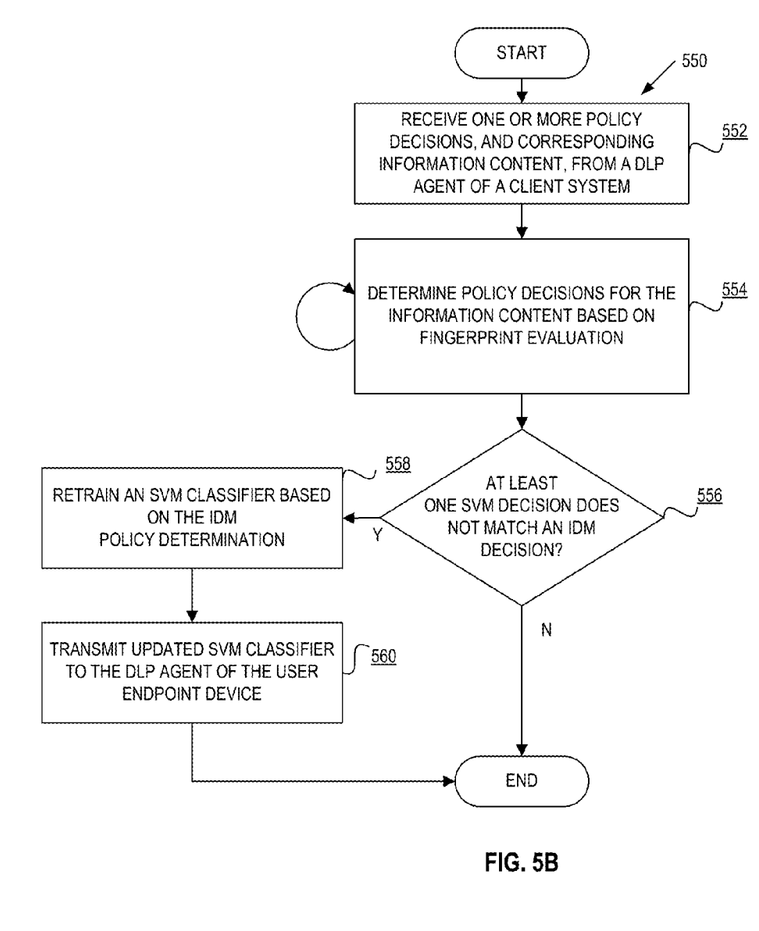
FIG. 5B is a flow diagram of one embodiment of a method for data monitoring server automatically retraining DLP classifiers deployed by a user endpoint device.

FIG. 5B is a flow diagram of one embodiment of a method 550 for data monitoring server automatically retraining DLP classifiers deployed by a user endpoint device. The method 550 is performed by processing logic that may comprise hardware (circuitry, dedicated logic, etc.), software (such as is run on a general purpose computer system or a dedicated machine), or a combination of both. In one embodiment, the method 500 is performed by a SVM training engine of a data monitoring server (e.g., SVM training engine 210).

Referring to FIG. 5B, processing logic begins by receiving one or more policy decisions, and corresponding information content that formed the basis for the decisions, from a DLP agent of a client system (processing block 552). In one embodiment, the policy decisions and the information content are received in a batch. In one embodiment, the policy violation decisions were based on decisions utilizing either an initial SVM classifier or an updated/retrained SVM classifier, as discussed above.

Processing logic determines policy decisions for the information content based on fingerprint evaluation (processing block 554). When a batch of policy decisions are received by processing logic, each SVM classifier decision is compared with each fingerprint-based policy decision.

Processing logic then determines whether at least one of the SVM classifier's decisions does not match a decision made by the fingerprint-based evaluation (processing block 556). When there are no inconsistent decisions, the method ends because processing logic need not perform any retraining of the SVM classifier (i.e., all of the SVM classifier's decisions were consistent with those made with fingerprint-based evaluation). However, when there are inconsistent decisions between the SVM classifier and fingerprint-based evaluation, processing logic has determined that the SVM classifier should be retrained and advances to processing block 558. In one embodiment, processing logic utilizes the decision matrix illustrated in FIG. 6 to determine when to retrain an SVM classifier.

When there are inconsistencies between SVM classifier and fingerprint-based evaluation decisions, processing logic retrains an SVM classifier based on the fingerprint evaluation policy determinations (processing block 556). In one embodiment, processing logic retrains the SVM classifier on a per-event basis for each of the inconsistent policy decisions. In another embodiment, processing logic retrains the SVM classifier utilizing a batch of policy decisions. In one embodiment, processing logic retrains the SVM classifier when the batch of policy decisions reaches a threshold size (e.g., when there are at least n policy decisions available for retraining the SVM classifier), with the batch of policy decisions available at recurring time intervals (e.g., retain an SVM classifier every 12 hours, 24 hours, etc.), with the batch of policy decisions available at a specified time (e.g., retraining set to occur at predicted system idle times), etc.

Processing logic then transmits the updated SVM classifier to the DLP agent of the user endpoint device (processing block 562). In one embodiment, processing logic utilizes the information content from the inconsistent policy decisions to refine a predictor function of an SVM classifier. In one embodiment, the retrained SVM classifier is a more accurate version of a SVM classifier that preceded it. That is, the retrained SVM classifier is refined from the policy decisions of a more powerful, but also more computationally and resource demanding classification technique.

Figure 7:
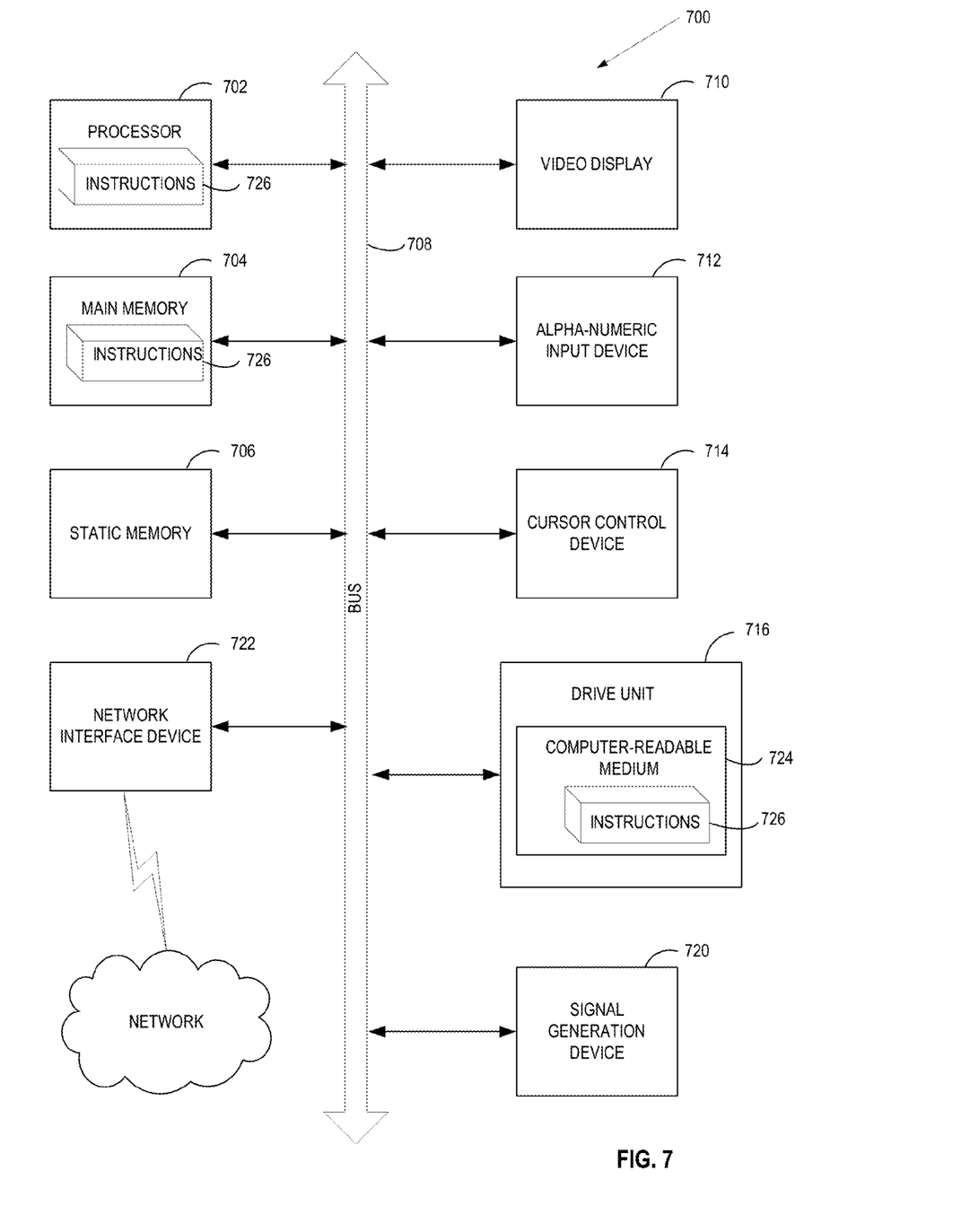
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a netbook, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A computer implemented method comprising:
   generating, by a client computer system, a first determination on whether an information content item on the client computer system violates a data loss prevention (DLP) policy, the first determination being generated based on a support vector machine (SVM) classifier associated with the DLP policy;
   transmitting the information content item and the first determination on whether the information content item violates the DLP policy to a remote system;
   receiving an updated SVM classifier from the remote system if the first determination differs from a second determination based on document fingerprint matching by the remote system, wherein the updated SVM classifier reflects the second determination with respect to the information content item; and
   determining, by the client computer system, whether other information content items on the client computer system violate the DLP policy using the updated SVM classifier.

2. The method of claim 1, further comprising:
   automatically replacing the SVM classifier with the updated SVM classifier.

3. The method of claim 2, wherein the updated SVM classifier is generated by the remote system utilizing document fingerprint matching based on the information content item and the second determination on whether the information content item violates the DLP policy.

4. The method of claim 1, further comprising:
making a plurality of policy decisions indicating whether a plurality of information content items violate one or more DLP policies;
transmitting the plurality of policy decisions and an information content item of the plurality of information content items corresponding to the plurality of policy decisions to the remote system; and
receiving at least one updated SVM classifier from the remote system for the one or more DLP policies, wherein the at least one updated SVM classifier is based on document fingerprint matching by the remote system using the plurality of policy decisions and the information content item corresponding to the plurality of policy decisions.

5. The method of claim 1, wherein the client computer system is selected from a group comprising at least one of a personal digital assistant, cellular telephone, netbook, laptop computer, or personal computer.

6. A non-transitory computer readable storage medium including instructions that, when executed by a processing device, cause the processing device to perform a method comprising:
generating, by the processing device, a first determination on whether an information content item violates a data loss prevention (DLP) policy, the first determination being generated based on a support vector machine (SVM) classifier associated with the DLP policy;
transmitting the information content item and the first determination on whether the information content item violates the DLP policy to a remote system;
receiving an updated SVM classifier from the remote system if the first determination differs from a second determination based on document fingerprint matching by the remote system, wherein the updated SVM classifier reflects the second determination with respect to the information content item; and
determining, by the processing device, whether other information content items on a client computer system violate the DLP policy using the updated SVM classifier.

7. The non-transitory computer readable storage medium of claim 6, the method further comprising:
automatically replacing the SVM classifier with the updated SVM classifier.

8. The non-transitory computer readable storage medium of claim 7, wherein the updated SVM classifier is generated by the remote system utilizing document fingerprint matching based on the information content item and the second determination on whether the information content item violates the DLP policy.

9. A computer implemented method comprising:
receiving, by a server computer system from a client computer system, an information content item and a first determination on whether the information content item violates a data loss prevention (DLP) policy, wherein the first determination is provided by the client computer system and based on a support vector machine (SVM) classifier associated with the DLP policy;
generating, by the server computer system, a second determination on whether the information content item violates the DLP policy based on document fingerprint matching managed by the server computer system;
determining whether the first determination matches the second determination;
updating the SVM classifier to reflect the second determination with respect to the information content if the first determination does not match the second determination; and
transmitting the updated SVM classifier to the client computer system for identifying other information content items on the client computer system that violate the DLP policy.

10. The method of claim 9, further comprising:
receiving a training set of information content items;
automatically training the SVM classifier based on determinations made from the training set of information content items and the document fingerprint matching; and
transmitting the SVM classifier to the client computer system.

11. The method of claim 9, wherein creating the updated SVM classifier comprises:
adding the second determination to a training set of information content items to create an expanded data set; and
creating an updated predictor function using the expanded data set, wherein the updated SVM classifier comprises an updated prediction function.

12. A non-transitory computer readable storage medium including instructions that, when executed by a processing device, cause the processing device to perform a method comprising:
receiving, by the processing device from a client computer system, an information content item and a first determination on whether the information content item violates a data loss prevention (DLP) policy, the first determination provided by the client computer system and based on a support vector machine (SVM) classifier associated with the DLP policy;
generating a second determination on whether the information content item violates the DLP policy based on document fingerprint matching;
determining whether the first determination matches the second determination;
updating the SVM classifier to reflect the second determination with respect to the information content item if the first determination does not match the second determination; and
transmitting the updated SVM classifier to the client computer system for identifying other information content items on the client computer system that violate the DLP policy.

13. The non-transitory computer readable storage medium of claim 12, wherein creating the updated SVM classifier comprises:
adding the second determination to a training set of information content items to create an expanded data set; and
creating an updated predictor function using the expanded data set, wherein the updated SVM classifier comprises an updated prediction function.

14. A system comprising:
a memory; and
a processing device coupled with the memory to:
receive, from a client computer system, an information content item and a first determination on whether the information content item violates a data loss prevention (DLP) policy, the first determination provided by the client computer system and based on a support vector machine (SVM) classifier associated with the DLP policy generate a second determination on whether the information content item violates the DLP policy based on document fingerprint matching;

determine whether the first determination matches the second determination;

update the SVM classifier to reflect the second determination with respect to the information content item if the first determination does not match the second determination; and transmit the updated SVM classifier to the client computer system for identifying other information content items on the client computer system that violate the DLP policy.

15. The system of claim 14, further comprising:

the client computer system, communicably coupled with the processing device over a network, to:

generate the first determination on whether the information content item on the client computer system violates a DLP policy utilizing the SVM classifier associated with the DLP policy;

transmit the information content item and the first determination on whether the information content violates the DLP policy to the processing device;

receive the updated SVM classifier from the processing device if the first determination differs from the second determination based on document fingerprint matching, wherein the updated SVM classifier reflects the second determination with respect to the information content item; and determine whether other information content items on the client computer system violate the DLP policy using the updated SVM classifier.

16. The system of claim 15, further comprising the client computer system to automatically replace the SVM classifier with the updated SVM classifier.

* * * * *